(12) United States Patent
Wallace et al.

(10) Patent No.: US 8,262,347 B2
(45) Date of Patent: Sep. 11, 2012

(54) FLUID CATCHMENT SYSTEM FOR A WIND TURBINE

(75) Inventors: Jack Wallace, Yucaipa, CA (US); Mark Dawson, Boise, ID (US)

(73) Assignee: Frontier Pro Services, LLC, West Conshohocken, PA (US)

( * ) Notice: Subject to any disclaimer, the term of this patent is extended or adjusted under 35 U.S.C. 154(b) by 895 days.

(21) Appl. No.: 12/273,036

(22) Filed: Nov. 18, 2008

(65) Prior Publication Data

US 2010/0124507 A1 May 20, 2010

Related U.S. Application Data

(60) Provisional application No. 61/011,771, filed on Jan. 17, 2008.

(51) Int. Cl.
*F03D 11/00* (2006.01)
(52) U.S. Cl. .................. 415/169.2; 415/232; 290/55
(58) Field of Classification Search .................... 415/232
See application file for complete search history.

(56) References Cited

U.S. PATENT DOCUMENTS

| 6,902,370 B2 | 6/2005 | Dawson et al. |
| 2005/0285406 A1 | 12/2005 | Dawson et al. |

FOREIGN PATENT DOCUMENTS

DE 102005032627 B3 * 8/2006

* cited by examiner

*Primary Examiner* — Stephen W Smoot
(74) *Attorney, Agent, or Firm* — Banner & Witcoff, Ltd.

(57) ABSTRACT

A fluid catchment system for a wind turbine is provided. The wind turbine has a nacelle mounted to a tower. The fluid catchment system includes at least one fluid accumulator in fluid communication with the interior of the nacelle and configured to receive fluid exiting from the nacelle. The fluid accumulator is configured to be positioned at least partially beneath the nacelle and to be attached to at least one of the tower and the nacelle. An oil absorbent material may be retained by the fluid accumulator. A fluid collector may be provided to collect fluid from the fluid accumulator. A fluid catchment system having a fluid accumulator located on a wind turbine blade is also provided. Further, a wind turbine including a fluid catchment system is provided.

20 Claims, 12 Drawing Sheets

FLUID CATCHMENT SYSTEM FOR A WIND TURBINE

RELATED APPLICATIONS

This application claims the benefit of U.S. Provisional Application No. 61/011,771, filed 17 Jan. 2008.

FIELD OF THE INVENTION

The invention relates to a fluid catchment system. Specifically, the invention relates to a fluid catchment system for use in the operation of tower-mounted wind turbines.

BACKGROUND OF THE INVENTION

A wind turbine is a machine that uses the kinetic energy of wind to generate electricity or to perform other useful work. Components in a wind turbine nacelle usually include a gearbox, generator, yaw drive, and blade pitch actuation system. Fluids used in turbines include, but are not limited to, coolant for cooling electronic and mechanical components, gear oil in gearboxes for lubrication and cooling, grease for lubricating bearings, and hydraulic fluid in actuation systems.

There are a variety of ways in which these fluids can be spilled, leaked, etc. Fluids can be spilled during commissioning or during normal maintenance of gearboxes and hydraulic systems. Seals in gearboxes, cooling systems, and hydraulic systems can fail and leak. High pressure fluid lines can burst.

The wind turbine components are generally mounted to a frame, which is then bolted to a large bearing on the top of the tower. Sometimes the components are modular, bolting to each other to minimize or eliminate extra framework. In either case, a nacelle or cover is added to provide protection from the weather. The nacelle has a large hole in the bottom where the frame is bolted to the bearing and tower top. The nacelle can rotate around on the top of the tower to face the wind turbine blades into the wind. This makes it very difficult to contain any leaking fluids, which simply fall out of the bottom of the nacelle, where they fall to the ground or run down the outside of the tower.

Spilled and leaked fluids can cause environmental, operational, and visual concerns. For example, fluids exiting the nacelle may flow down the tower where they are blown from the tower by the wind or flow down the tower to the ground. Further, fluids on the towers can cause streaking and attract dirt. In order to maintain visual aesthetics, fluid must be periodically washed from towers. Wash runoff then carries the fluids into the surrounding environment.

It would be advantageous to provide a device which would prevent spilled or leaked fluids from escaping into the surrounding environment or damaging the visual aesthetics of a wind turbine. It would also be advantageous to prevent runoff from periodic tower washing from flowing into the surrounding environment.

SUMMARY OF THE INVENTION

The disclosed invention provides a system to collect fluids from a wind turbine. In one embodiment, a fluid catchment system for a wind turbine having a nacelle mounted to a tower includes at least one fluid accumulator in fluid communication with the interior of the nacelle. The fluid accumulator is configured to receive fluid exiting from the interior of the nacelle. Further, the fluid accumulator is configured to be positioned at least partially beneath the nacelle and to be attached to one of the tower and the nacelle.

A collector may be attached to and in fluid communication with the fluid accumulator. The collector may be configured to provide a flow path for the accumulated fluid exiting from the fluid accumulator. An oil absorbent material may be located within at least a portion of the fluid accumulator.

The fluid catchment system may include a tensioning element configured to encircle the tower and retain the fluid accumulator to the tower. The fluid catchment system may further include one or more fasteners having head surfaces suitable for adhesively bonding the fasteners to the tower.

According to a second embodiment of the invention, a fluid catchment system for a tower is provided. This fluid catchment system includes one or more fluid accumulators defining a fluid collection region. The fluid accumulators are configured to substantially encircle the tower. Further, the fluid accumulators have an inner wall configured to lie substantially tangential to an outer surface of the tower.

In another embodiment of the invention a fluid catchment system includes one or more fluid accumulators attached to a wall and configured to receive fluid traveling along the wall and an oil absorbent material retained by the one or more fluid accumulators.

According to yet another embodiment, a wind turbine system includes a wind turbine having a nacelle and a tower having a base and a top, the nacelle being mounted to the top of the tower. The wind turbine system further includes a fluid catchment system including one or more fluid accumulators configured to receive fluid exiting from the nacelle, the fluid accumulators configured to be positioned at least partially beneath the nacelle and to be attached to one of the tower and the nacelle.

In a further embodiment, a method for mounting a fluid catchment system to a wind turbine is provided. The method includes attaching a plurality of supports to a surface of the wind turbine, locating a fluid accumulator configured to collect fluid on the supports, and securing the fluid accumulator to the surface. The step of attaching may include attaching the plurality of supports to a tower of the wind turbine and/or to a blade of the wind turbine.

In even a further embodiment, a fluid catchment system for a wind turbine blade is provided. The catchment system includes at least one fluid accumulator in fluid communication with an interior of the blade and configured to receive fluid moving from a root end of the blade towards a tip end of the blade. The fluid accumulator is configured to be positioned at least partially within the blade and to be attached to an interior surface of the blade. The fluid catchment system may further include an oil absorbent material, a seal configured to prevent leakage between the fluid accumulator and the surface of the blade, a lip configured to prevent fluid from exiting the catchment system in the direction of the root end of the blade, and an opening configured to allow the passage of fluid.

In another embodiment, a fluid catchment system for a wind turbine blade including a fluid accumulator in fluid communication with an exterior of the blade is provided. The fluid accumulator is configured to at least partially encircle the blade and to be attached to an exterior surface of the blade. The fluid catchment system may also include an oil absorbent material, a seal configured to prevent leakage between the fluid accumulator and the exterior surface of the blade, a lip configured to prevent fluid from exiting the catchment system in the direction of the root end of the blade, and/or an opening configured to allow the passage of fluid.

These and additional features and advantages of the invention disclosed herein will be further understood from the following detailed disclosure of certain embodiments.

BRIEF DESCRIPTION OF THE DRAWINGS

Features and advantages according to embodiments of the invention will be apparent from the following Detailed Description taken in conjunction with the accompanying drawings, in which.

The figures referred to above are not necessarily drawn to scale and should be understood to provide a representation of the invention, illustrative of the principles involved. Thus, some features of the invention may have been enlarged or distorted relative to other features to facilitate explanation and understanding. The same reference numbers are used in the drawings for similar or identical components and features shown in various alternative embodiments.

DETAILED DESCRIPTION OF THE INVENTION

Figure 1:
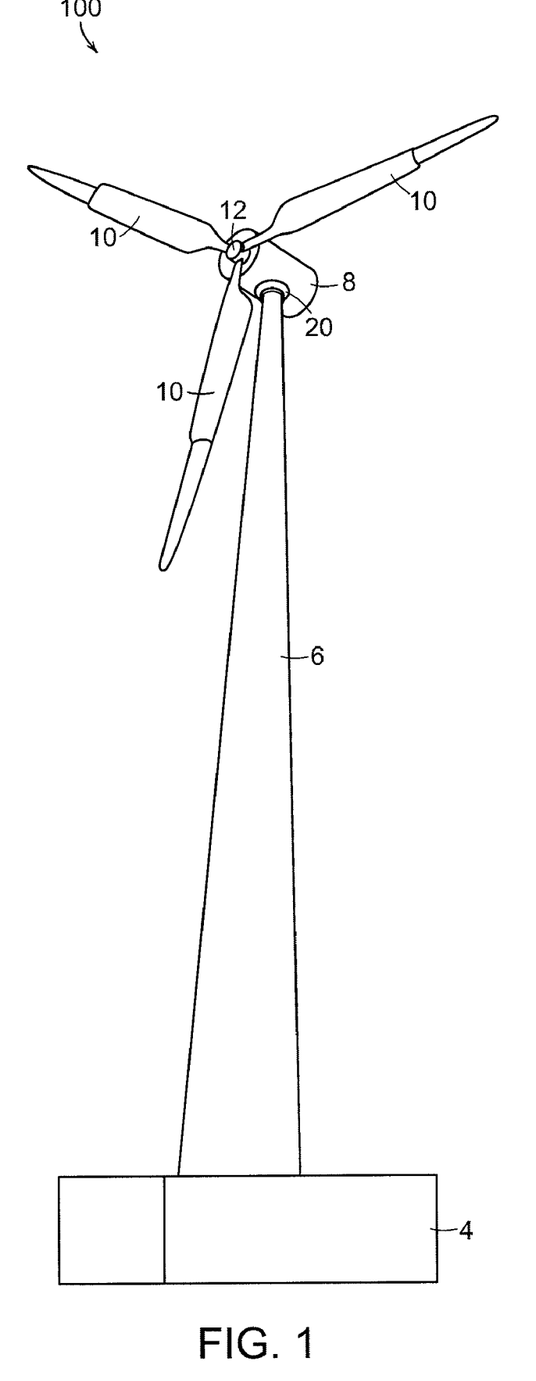
FIG. 1 is a schematic perspective view of a wind turbine with a tower, nacelle, and rotor according to an embodiment of the present invention.

FIG. 1 shows a wind turbine 100 on a foundation 4 with a tower 6 supporting a nacelle 8. Multiple blades 10 are attached to a hub 12, each blade 10 having a root end and a tip end. Hub 12 is connected to a drive train within nacelle 8. A catchment system 20 is shown attached to tower 6 of wind turbine 100.

Figure 2:
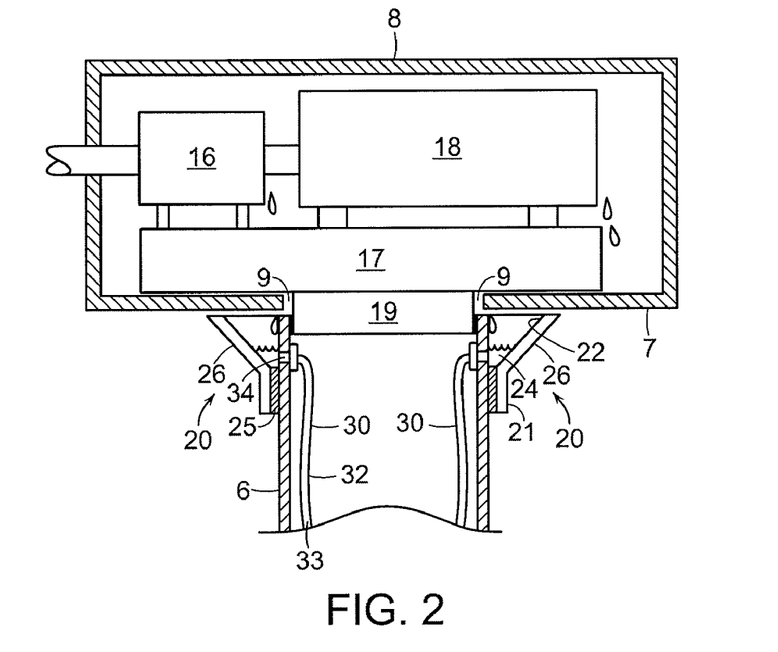
FIG. 2 is a schematic cross-section view of portion of a wind turbine, specifically where the nacelle is attached to the tower, illustrating a catchment system according to an embodiment of the present invention.

According to an embodiment of the present invention, FIG. 2 schematically illustrates an interior view of nacelle 8 and a cross-section of tower 6 used to support nacelle 8. Nacelle 8 typically houses, among other things, a gearbox 16 and a generator 18. Nacelle 8 is attached to tower 6 via a nacelle frame 17 and a bearing 19.

In the embodiment of FIG. 2, working fluids within nacelle 8 may exit (or leak) from nacelle 8 at a fluid egress region 9. Fluid egress region 9 is typically to be found where fluid leakage would most likely occur, i.e., at a lower surface 7 of nacelle 8. In one embodiment, fluid egress region 9 would most likely occur where nacelle 8 is mounted to tower 6. Other seams or joints in the lower surface of nacelle 8 may also provide likely places for fluids to exit from nacelle 8. Further, special fluid egress points may be provided in the lower surface of nacelle 8, such that leaking fluid may be directed to particular locations.

In one embodiment as shown in FIG. 2, at the base of nacelle 8, adjacent to where nacelle 8 is attached to tower 6, a catchment system 20 may be provided to catch leaked fluids. Catchment system 20 includes a fluid accumulator 26 having a surface 22 to collect fluids that leak from nacelle 8. Surface 22 is typically located below fluid egress region 9. Surface 22 is angled so that collected fluid may flow to a collection region 24.

In the embodiment of FIG. 2, catchment system 20 generally extends around the outer circumference of tower 6. Catchment system 20 may extend completely or only partially around the outer circumference of tower 6. Fluid accumulator 26 may include a flange 21 to assist in attaching catchment system 20 to tower 6. Mechanical fasteners, such as bolts, pins, seats, etc. may be used to secure flange 21 to tower 6. Optionally, welding, brazing or adhesives, such as epoxy, may be used to secure flange 21 to tower 6. Catchment system 20 may also include a seal 25, which may be provided between flange 21 and tower 6.

In the embodiment of FIG. 2, catchment system 20 may include a collector 30. Collector 30 may be in fluid communication with fluid accumulator 26 at collection region 24. Collector 30 may include a tube 32 that provides a flow path 33 for the collected fluid. Fluid may flow in flow path 33 under the action of gravity, via pump action and/or via a siphon action. Collector 30 and flow path 33 may be substantially located within tower 6. In such instance, a fluid passage port 34 may be provided in the wall of tower 6 to establish fluid communication between collection region 24 and collector 30. As shown in FIG. 2, more than one collector 30 may be provided.

Figure 3:
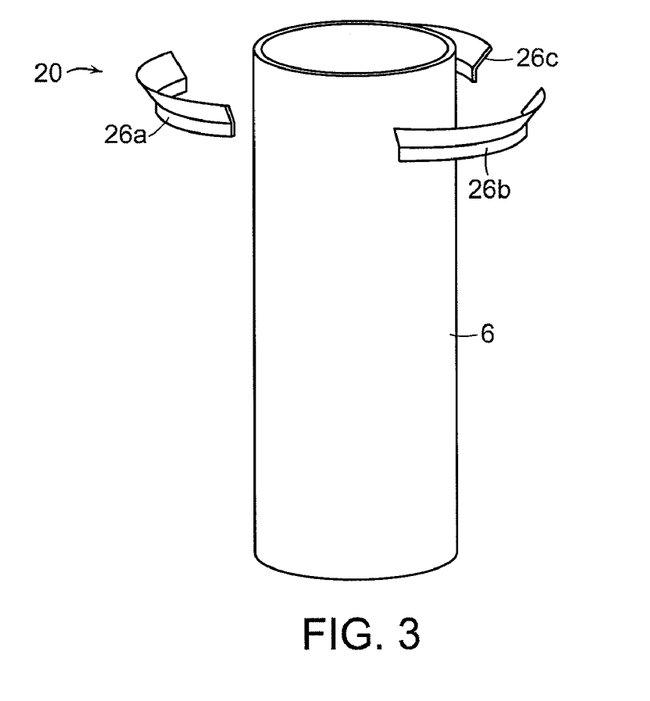
FIG. 3 is a schematic exploded view of a catchment system according to an embodiment of the present invention.

Referring to FIG. 3, an exploded perspective of an embodiment of the present invention is provided, illustrating that more than one fluid accumulator 26 may be provided in catchment system 20. Each fluid accumulator 26a, 26b, 26c may extend partially around the circumference of tower 6. Catchment system 20 may be retrofit to exiting wind turbines. For example, fluid accumulators 26a-26c may be lifted into place by a crane or other lifting device and attached to tower 6 and/or nacelle 8 by any suitable means. By way of non-limiting example, mounting bolts or pins may be threaded, bonded or otherwise attached to tower 6 to align and/or hold fluid accumulators 26a-26c in place during installation. An oil resistant adhesive and/or sealant, such as a silicone sealant, may be applied to secure and seal accumulators 26a-26c to tower 6 and to each other.

In certain embodiments, fluid may flow through collector 30 to be collected in a reservoir 36 (see FIG. 4) at the base of tower 6. Fluid in reservoir 36 may be periodically removed. Reservoir 36 should be large enough to contain the total amount of all fluids used in the nacelle 8 in case of catastrophic failure of the systems within nacelle 8. Reservoir 36 may be located inside or outside of tower 6 or even at a relatively remote location.

Figure 4:
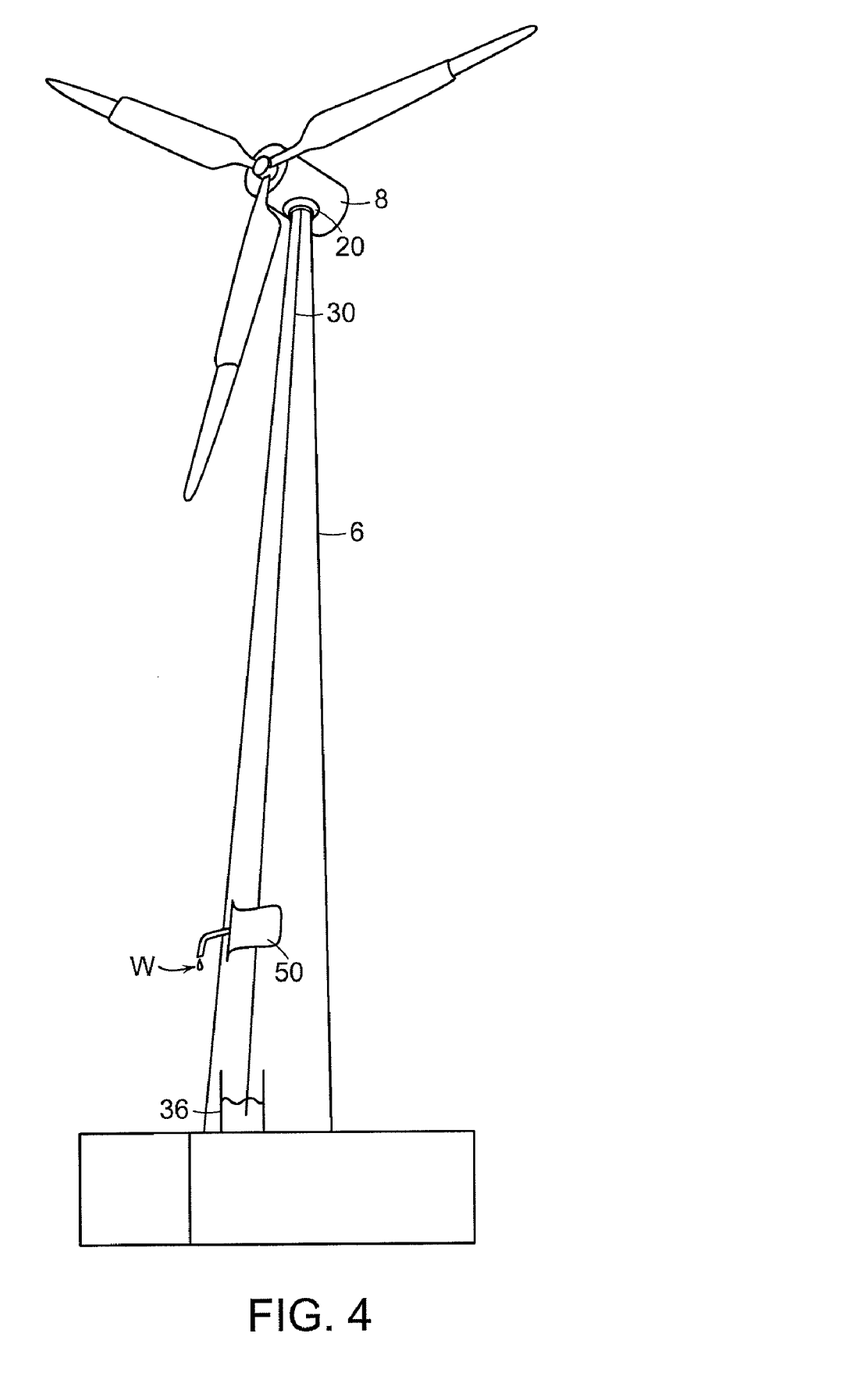
FIG. 4 is a schematic view of a catchment system according to another embodiment of the present invention.

In other embodiments, as also shown in FIG. 4, fluid may flow through collector 30 to a fluid separator 50. Such a fluid separator may, for example, be located within nacelle 8, within tower 6 or at the base of tower 6. Fluid separator 50 may be used to separate oil from water W. Clean water W may be allowed to exit to the environment, while the oil, contaminated water, etc. may be collected and removed.

Figure 5:
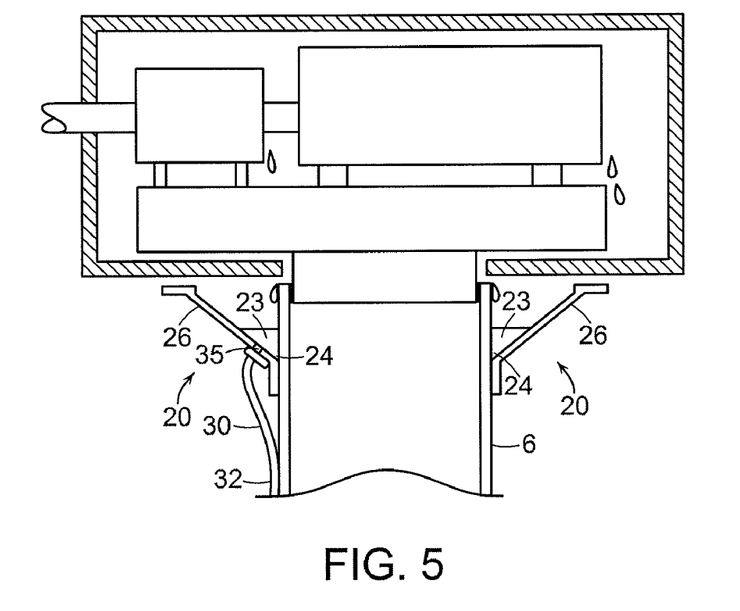
FIG. 5 is a schematic cross-section view of a portion of a wind turbine, illustrating a catchment system according to another embodiment of the present invention.

In another embodiment, as shown in FIG. 5, an oil absorbent material 23 may be provided within fluid accumulator 26, of catchment system 20. By way of non-limiting example, an oil absorbent material such as C.I.Agent, from C.I.Agent Solutions of Louisville, Ky., may be installed in collection region 24. C.I.Agent is a petroleum-based blend of polymers used to immobilize petroleum. C.I.Agent is supplied as a dry granular powder that encapsulates petroleum-based liquids and in the process is transformed into a cohesive rubber-like mass. In one aspect, the oil absorbent material 23 may act as a separator, such that when oil and water enter fluid accumulator 26, oil is absorbed and trapped by the oil absorbent material 23 and water is allowed to pass around or through the material.

Also shown in FIG. 5, a collector 30 may be in fluid communication with catchment system 20 via a fluid passage port 35 in fluid accumulator 26 to provide passage for fluid that collects in the accumulator, whether the fluid is oil, water, a combination of oil and water, or any other fluid. In this embodiment, tube 32 may be located outside of tower 6. Alternatively, the water that passes around the oil absorbent material 23 may be allowed to drain directly to the environment, without using a collector 30.

Figure 6:
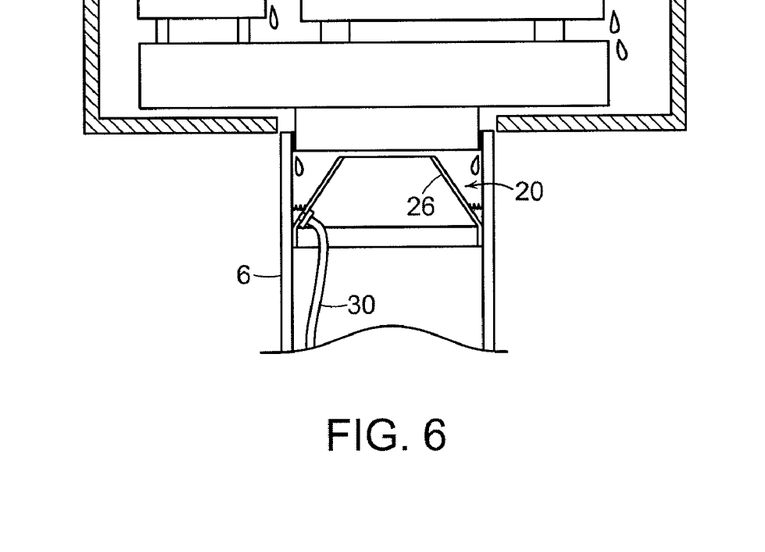
FIG. 6 is a schematic cross-section view of a portion of a wind turbine, illustrating a catchment system according to a further embodiment of the present invention.

In an alternative embodiment as best shown in FIG. 6, catchment system 20 may be provided within tower 6. In this embodiment, fluid accumulator 26 is shown attached to an interior circumference of tower 6. Optionally, fluid accumulator 26 may be attached to the lower surface of nacelle 8, or to both tower 6 and nacelle 8. When attached to the inner circumference of tower 6, fluid accumulator 26 may also function to collect fluid running down the interior surface of tower 6. This embodiment may have collector 30 to carry fluids away from fluid accumulator 26.

Figure 7:
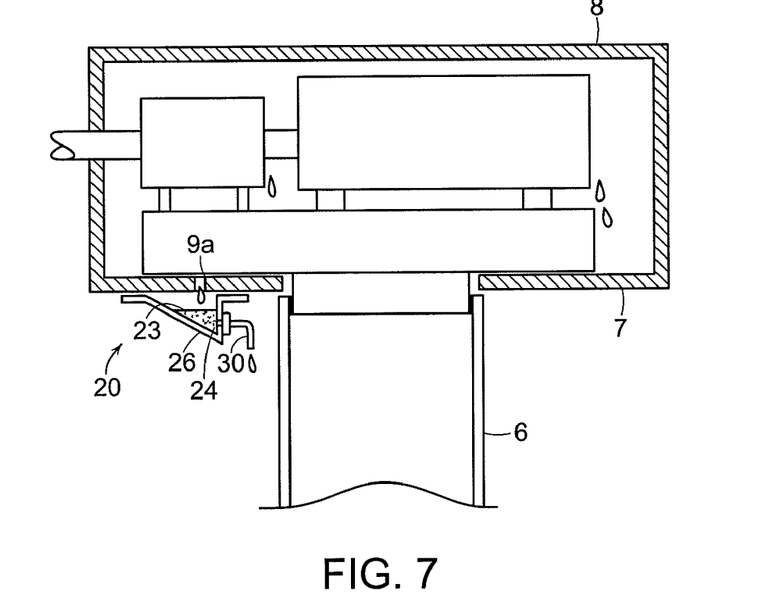
FIG. 7 is a schematic cross-section view of a portion of a wind turbine, illustrating a catchment system according to even another embodiment of the present invention.

In another alternative embodiment as best shown in FIG. 7, catchment system 20 may be attached to nacelle 8 and not to tower 6. This may be particularly desirable when special fluid egress points 9a are designed into the lower surface 7 of nacelle 8. Catchment system 20 need not extend completely around tower 6, but rather may be located to one side of tower 6 or extend only around a portion of tower 6. An oil absorbent material 23 may be provided within collection region 24 of accumulator 26. A collector 30 may be provided to collect and remove accumulated fluid, such as water that is not absorbed by the oil absorbent material.

Figure 8:
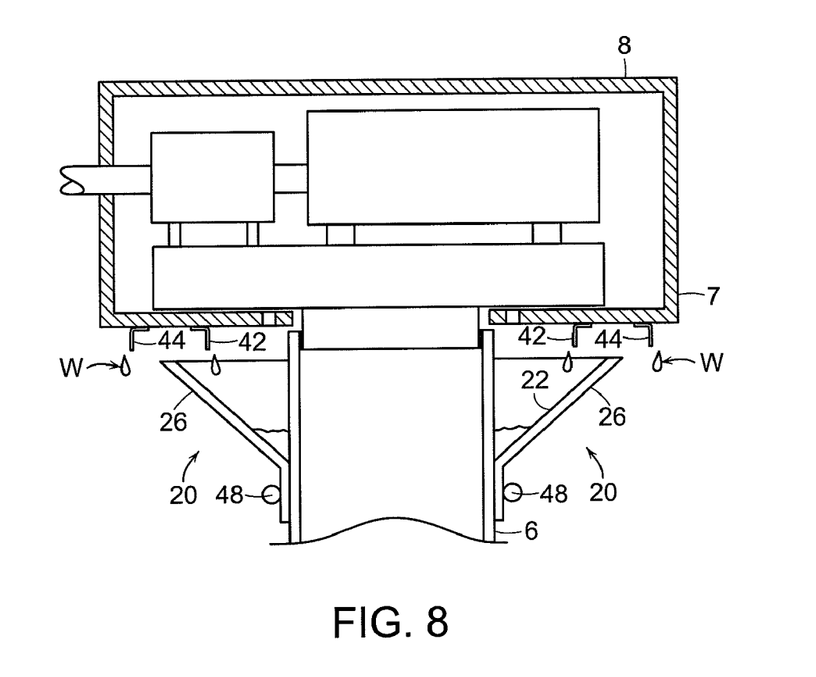
FIG. 8 is a schematic cross-section view of a portion of the wind turbine, illustrating a catchment system according to an embodiment of the present invention.

Referring to FIG. 8, fluid drip guides 42 may be provided on the underside of the lower surface of nacelle 8 to guide leaking fluid into catchment system 20. In one embodiment, fluid drip guides 42 extend from the underside of lower surface 7 of nacelle 8. In another embodiment, fluid drip guides may be channels formed or cut into lower surface 7 of nacelle 8. Fluid drip guides 42 may be provided, for example, above surface 22 of fluid accumulator 26 to cause leaked fluid to fall onto surface 22. Further, water W drip guides 44 may be provided on the underside of nacelle 8 to cause water W collecting or flowing on nacelle 8 to fall before it reaches catchment system 20.

In another aspect, also as shown in FIG. 8, a circumferential tensioning element 48, i.e., a strap or cable, may optionally be provided to secure or reinforce the attachment of catchment system 20 to tower 6. As an example, tensioning element 48 may be a packing strap. This may be particularly desirable if catchment system 20 is formed of multiple sections, as described above with respect to FIG. 3.

Figure 9A:
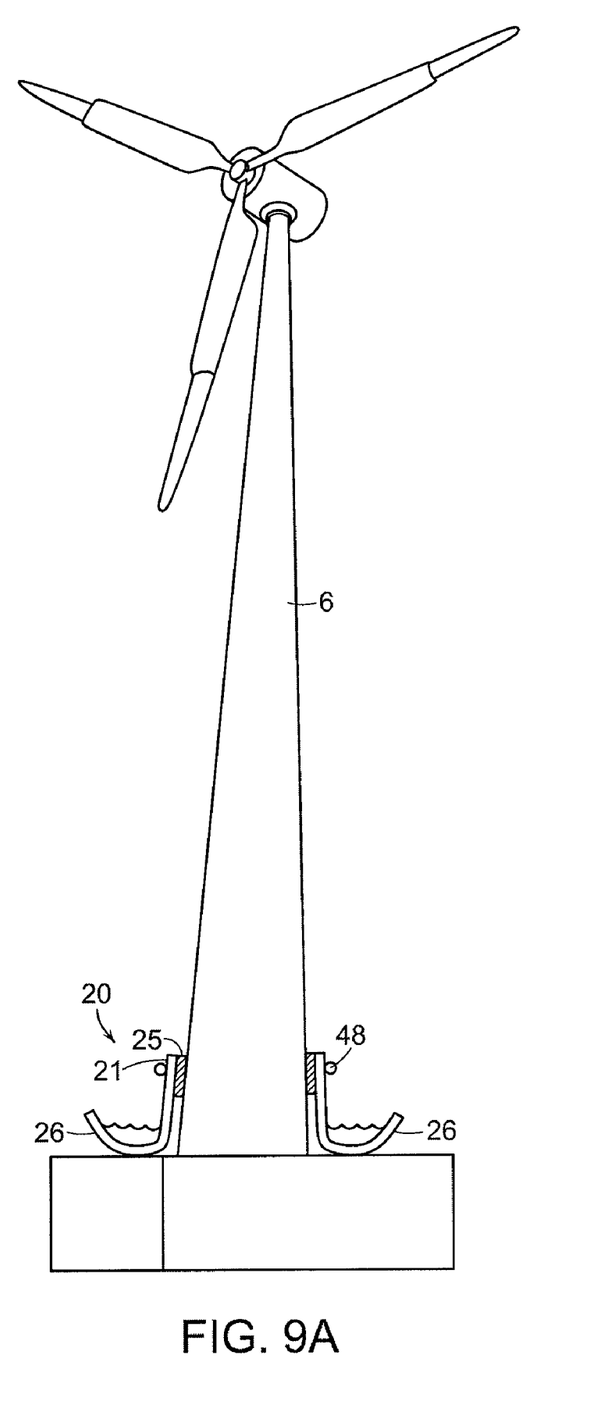
FIG. 9A is a schematic cross-section view of a portion of a tower, illustrating a catchment system according to a further embodiment of the present invention.
Figure 9B:
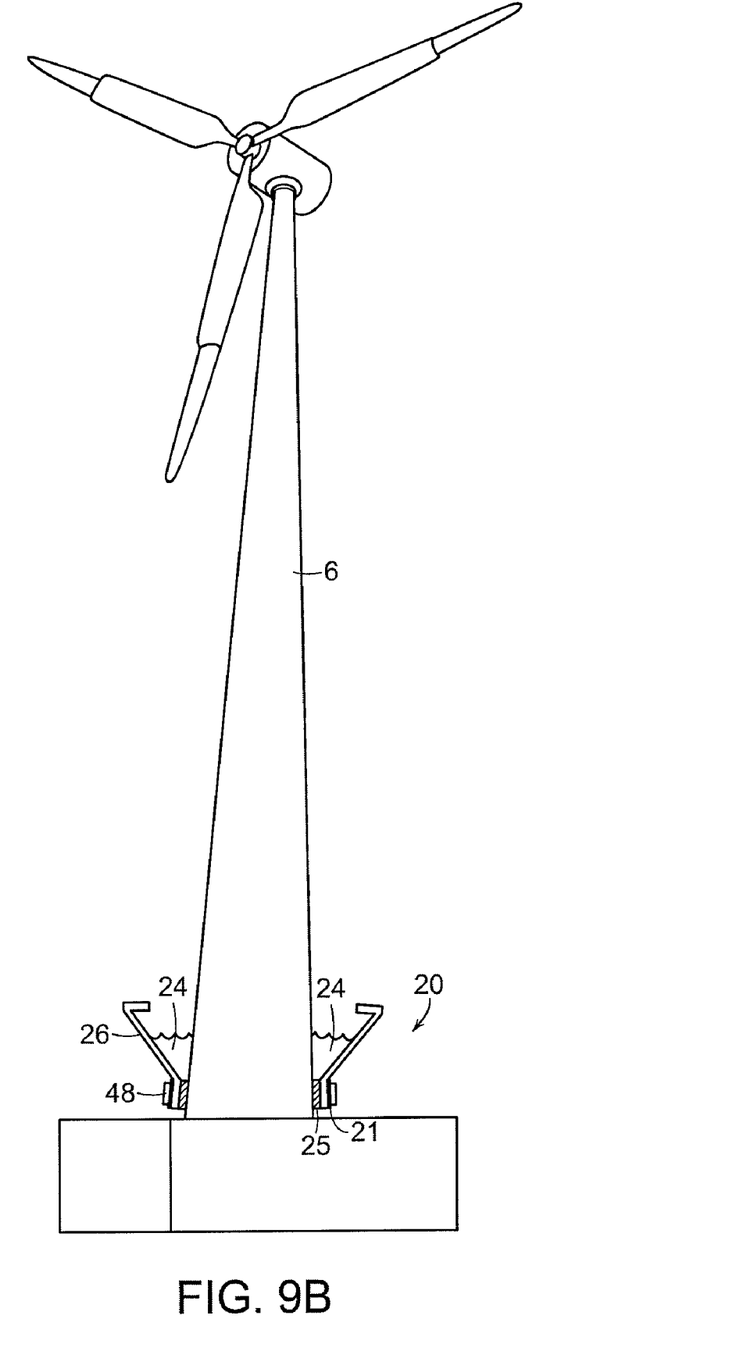
FIG. 9B is a schematic cross-section view of a portion of a tower, illustrating a catchment system according to another embodiment of the present invention.

According to other embodiments, as best shown in FIGS. 9A and 9B, catchment system 20 may be positioned to accumulate cleaning solution, contaminated fluids, and/or environmental unfriendly fluids that run down the length of tower 6. FIG. 9A illustrates a catchment system 20 installed at or near the base of tower 6 that includes one or more fluid accumulators 26 that encircle (or substantially encircle) tower 6. To provide a barrier to fluid flowing down the surface of tower 6, an inner circumferential flange 21 may be configured to lie substantially flush against the outer surface of tower 6 and to direct fluid into the collection region of catchment system 20. A seal 25 may be provided between flange 21 and the outer surface of tower 6. A circumferential tensioning element 48, illustrated as a cable in FIG. 9A, may be provided to secure or reinforce the attachment of catchment system 20 to tower 6. FIG. 9B shows a catchment system 20, somewhat similar to that shown in FIG. 2, except it is located closer to the base of tower 6. In this embodiment, tensioning element 48 is depicted as a packing strap. The catchment systems of FIGS. 9A and 9B may be temporarily installed at the base of tower 6, for example, by maintenance crews cleaning the towers 6. For ease of transport, assembly and disassembly, and further to accommodate towers 6 of differing configurations, it may be desirable to form fluid accumulator(s) 26 of a relatively flexible material. If necessary, frames may be provided to support the relatively flexible construction of such fluid accumulators 26. In the case of multiple fluid accumulators 26 forming a catchment system 20, the edges of the fluid accumulators 26 may overlap and/or engage one another to form a temporary seal between the accumulators 26.

Figure 10A:
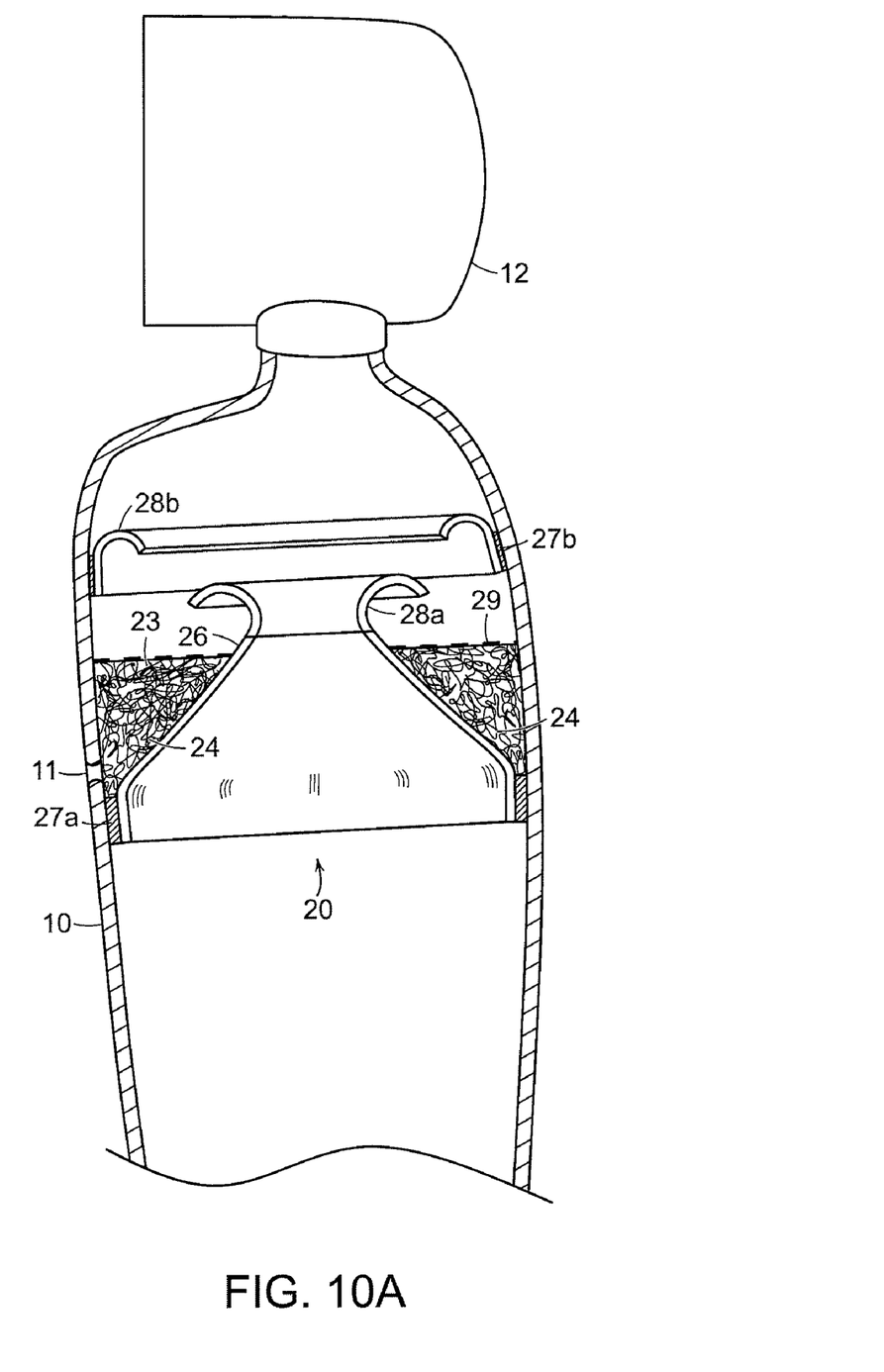
FIG. 10A is a schematic cross-section view of a portion of a wind turbine blade, illustrating an internal blade catchment system according to even a further embodiment of the present invention.

In a further embodiment as shown in FIG. 10A, catchment system 20 is located in the interior of a turbine blade 10, relatively near the attachment of blade 10 to hub 12. Catchment system 20 is configured to catch leaked fluids within blade 10. As shown in FIG. 10A, collection region 24 of accumulator 26 may be located radially outward of the opening to catchment system 20, such that centrifugal forces that arise when the blade 10 is turning will tend to drive fluid into the collection region. Further, in this embodiment, an oil absorbent material 23, such as C.I.Agent, is provided within collection region 24. A seal 27a is provided between accumulator 26 and the interior wall of blade 10. A fluid egress point 11 may be provided in blade 10 to allow water to drain from the interior of blade 10 and from collection region 24 of accumulator 26. A retaining member 29 may hold the oil absorbent material 23 within accumulator 26. In one embodiment retaining member 29 may be a screen. Oil absorbent material 23 retains accumulated fluid within catchment system 20 whether the blade 10 is rotating or not. Such oil absorbent material 23 may be periodically replaced, for example, when the wind turbine is serviced. The catchment system may include one or more lips 28a, 28b to prevent fluids from running back towards the hub 12 when the rotation slows or stops, leaving blade 10 pointed upwards. Lip 28a may be attached to an end of accumulator 26 that is located closest to hub 12. Lip 28b may be attached to an interior wall of blade 10 radially inward of accumulator 26. A seal 27b may be provided between lip 28b and the interior wall of blade 10.

Figure 10B:
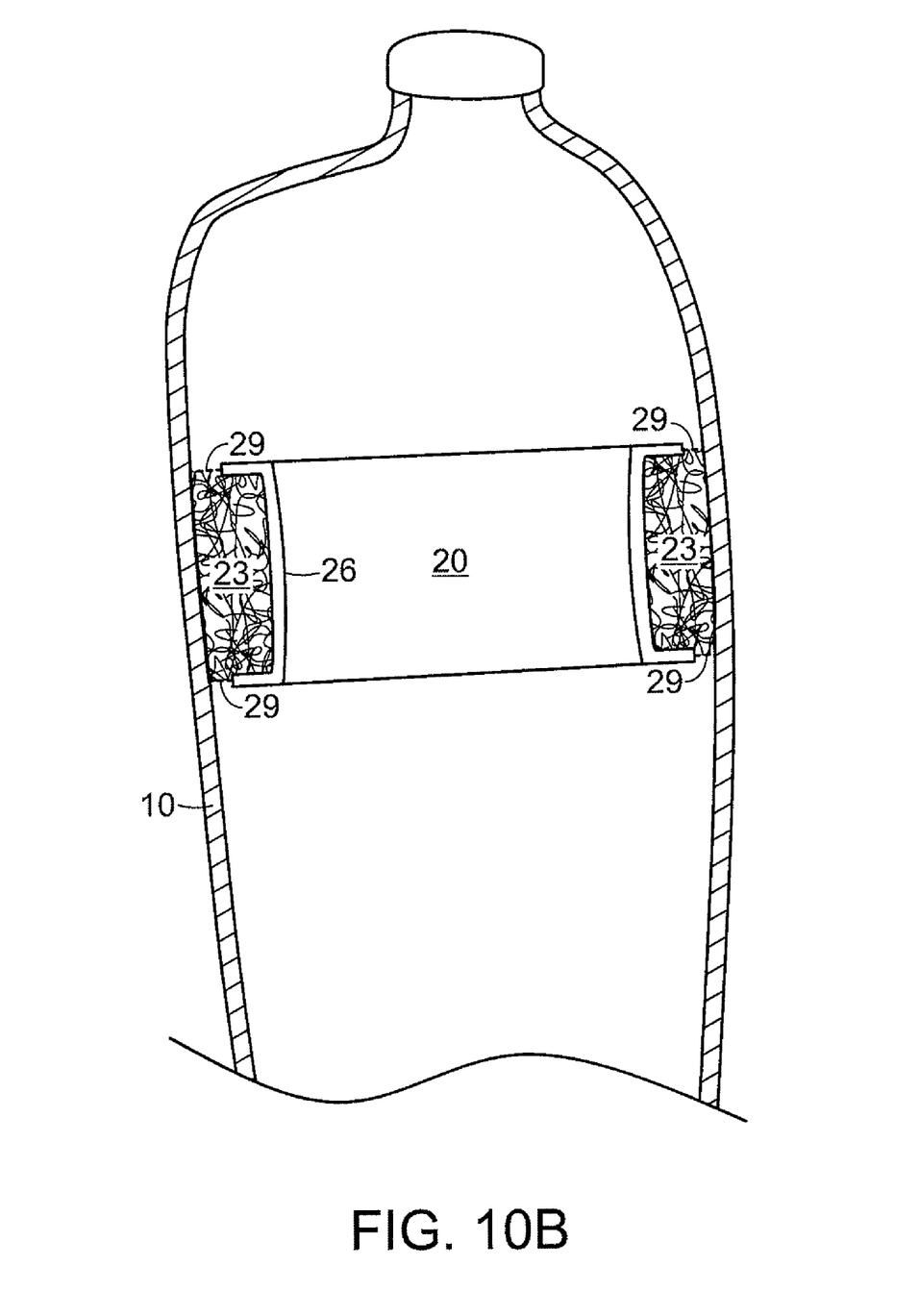
FIG. 10B is a schematic cross-section view of a portion of a wind turbine blade, illustrating an internal blade catchment system according to another embodiment of the present invention.

In another embodiment as shown in FIG. 10B, catchment system 20 is only meant to trap and collect oil and not other fluids. Accumulator 26 retains oil absorbent material 23 against the inner wall of blade 10. Retaining members 29 may be provided on either side of oil absorbent material 23 to keep material 23 within accumulator 26. Other fluids that are not trapped by the oil absorbent material may travel around or through accumulator 26.

Figure 10C:
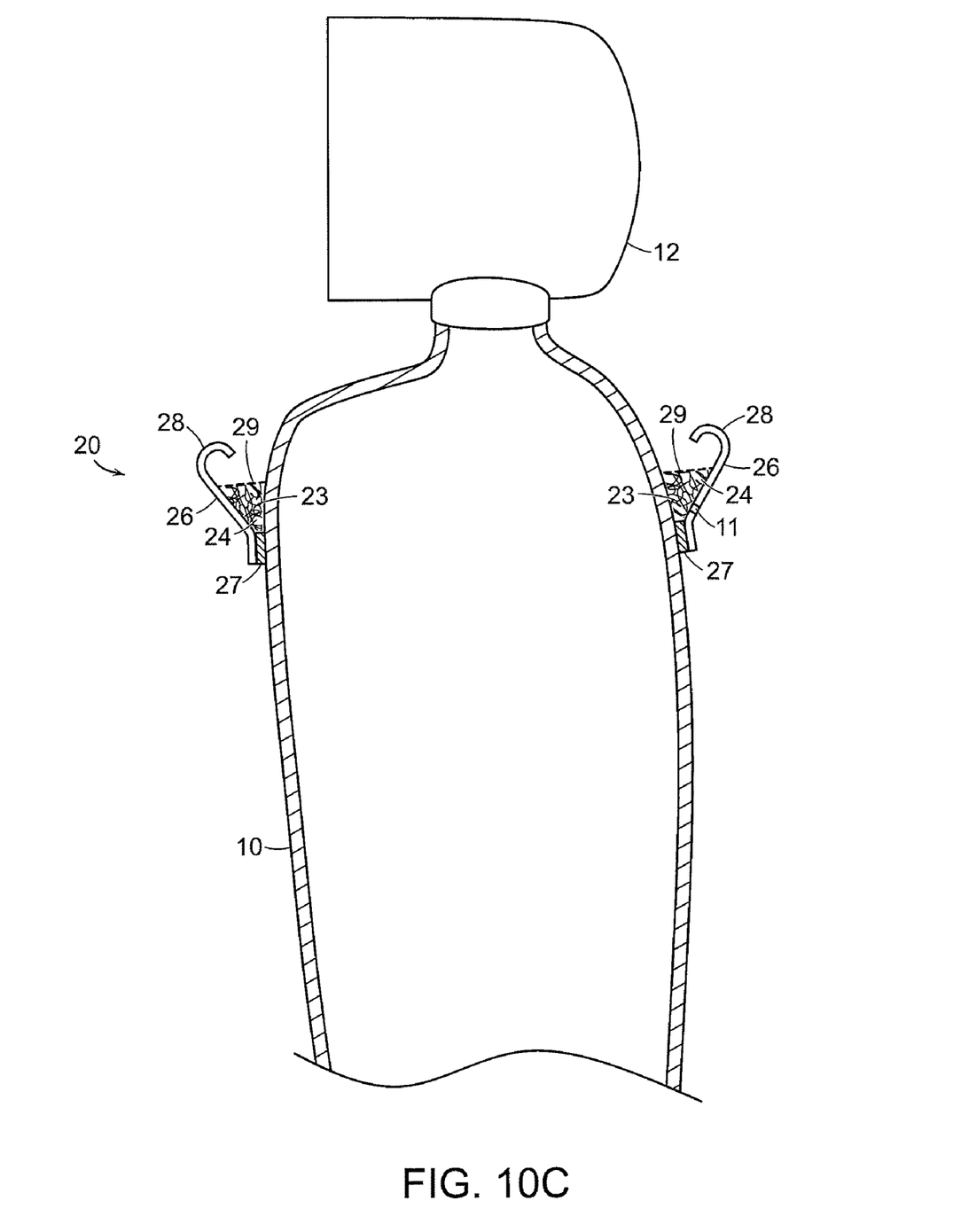
FIG. 10C is a schematic cross-section view of a portion of a wind turbine blade, illustrating an external blade catchment system according to an embodiment of the present invention.

In a further embodiment as shown in FIG. 10C, catchment system 20 is located on the exterior of a turbine blade 10, relatively near the attachment of blade 10 to hub 12. Catchment system 20 is configured to catch leaked fluids on the exterior of blade 10. As shown in FIG. 10C, collection region 24 of accumulator 26 may be located radially outward of the opening to catchment system 20, such that centrifugal forces that arise when the blade 10 is turning will tend to drive fluid into the collection region. Further, in this embodiment, an oil absorbent material 23, such as C.I.Agent, is provided within collection region 24. A seal 27 is provided between accumulator 26 and the exterior wall of blade 10. A fluid egress point 11 may be provided in blade 10 to allow water to drain from the interior of collection region 24 of accumulator 26. A retaining member 29 may hold the oil absorbent material 23 within accumulator 26. In one embodiment retaining member 29 may be a screen. Oil absorbent material 23 retains accumulated fluid within catchment system 20 whether the blade 10 is rotating or not. Such oil absorbent material 23 may be periodically replaced, for example, when the wind turbine is serviced. The accumulator 26 may have an additional lip 28 to prevent fluids from running back towards the hub 12 when the rotation slows or stops, leaving blade 10 pointed upwards.

Figure 10D:
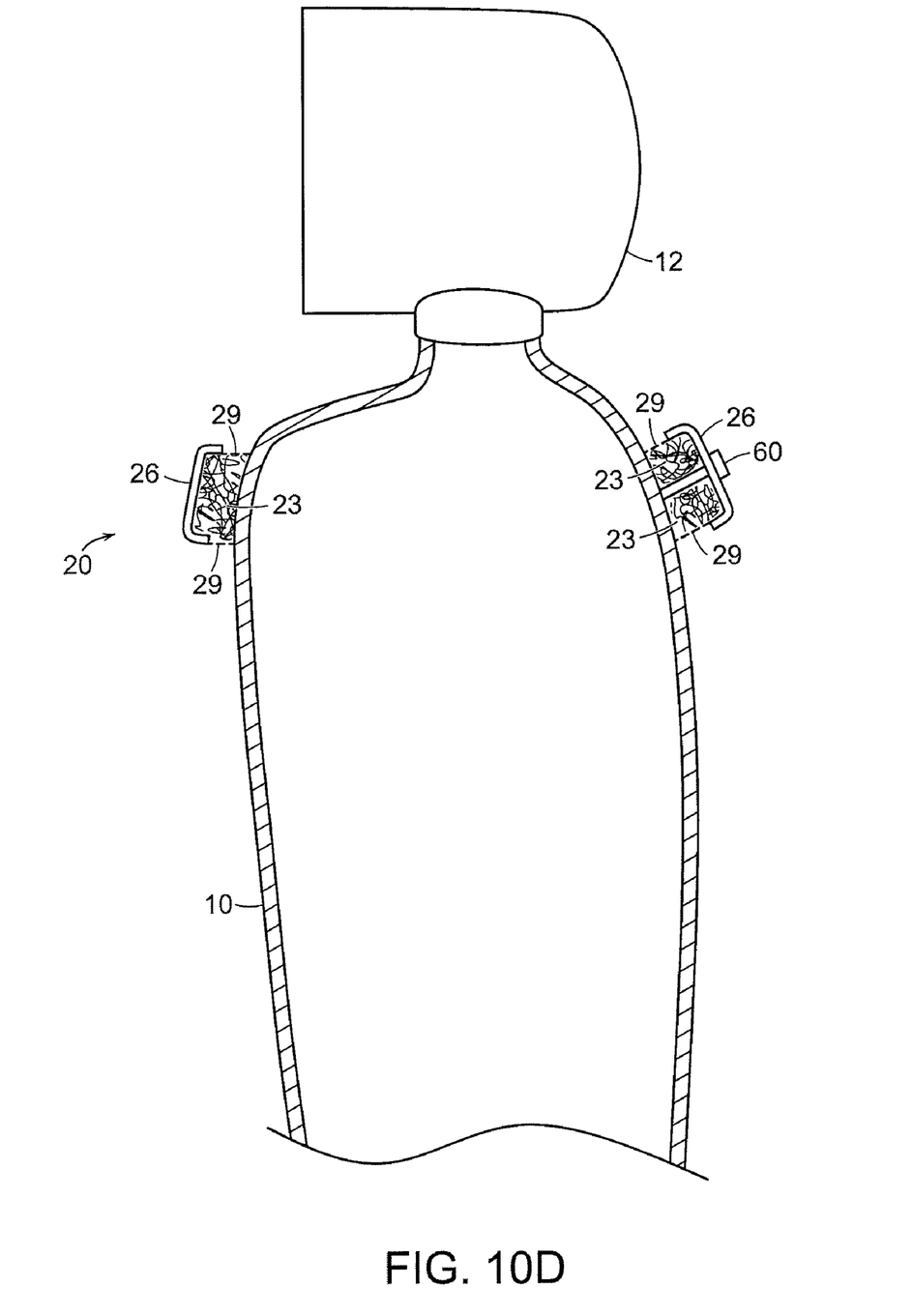
FIG. 10D is a schematic cross-section view of a portion of a wind turbine blade, illustrating an external blade catchment system according to another embodiment of the present invention.

In another embodiment as shown in FIG. 10D, catchment system 20 is only meant to trap and collect oil and not other fluids. Accumulator 26 retains oil absorbent material 23 against the inner wall of blade 10. Retaining members 29 may be provided on either side of oil absorbent material 23 to keep material 23 within accumulator 26. Other fluids that are not trapped by the oil absorbent material may travel around or through accumulator 26. A plurality of fasteners 60 may attach accumulator 26 to blade 10 with spacing that allows fluids not captured by the absorbent material 23 to pass through accumulator 26.

Figure 11:
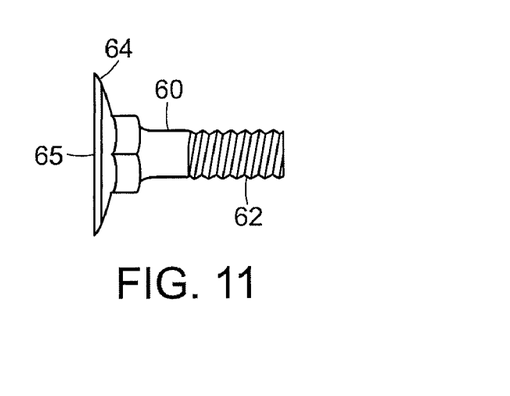
FIG. 11 schematically illustrates a bolt that may be used according to an embodiment of the present invention.
Figure 12:
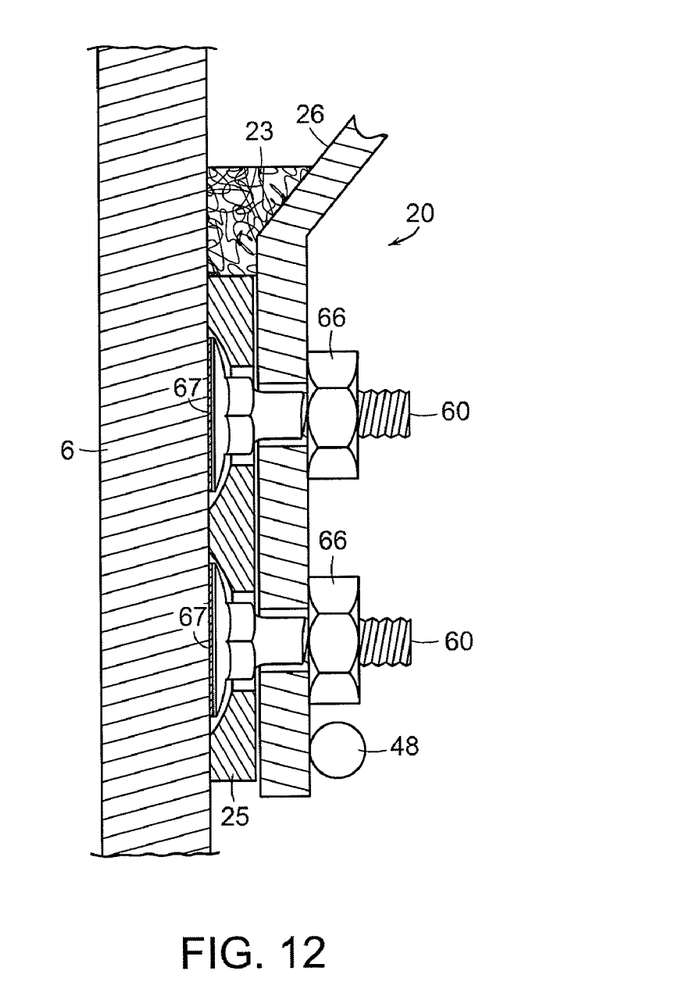
FIG. 12 is a schematic cross-section illustration of a flange of a catchment system mounted to a tower according to an embodiment of the present invention.

Referring to FIGS. 11 and 12, a method of installing catchment system 20 to tower 6 as a retrofit feature is described herein. Fasteners 60, each having a threaded body 62 and a head 64, may be provided to act as supports for fluid accumulators 26 as they are positioned on tower 6 and secured in place. Fastener 60 has a head surface 65 that is relatively flat and has a relatively large footprint or surface area. As an example of a suitable fastener, fastener 60 may be an elevator bolt. As shown in FIG. 12, fasteners 60 are adhesively fastened to tower 6 by applying adhesive 67 to surface 65 and pressing surface 65 against tower 6. A suitable adhesive such as a two-part, fast setting epoxy may be used. Once fasteners 60 are secured, a section of accumulator 26 may be hoisted into place and secured onto fasteners 60 with threaded nuts 66. Alternatively, fasteners 60 may have head surfaces configured for welding to the mounting surface. Other alternative configurations for attaching fasteners 60 to the mounting surface may include screwing a portion of fastener 60 into drilled holes or through-bolting fastener 60 to the mounting surface.

Still referring to FIGS. 11 and 12, an oil absorbent material 23 may be placed within the fluid collection region of the fluid accumulators. A seal 25 may optionally be placed against tower 6 prior to locating accumulator 26 on fasteners 60. Silicone sealant may also be used to make catchment system 20 fluid tight. Alternatively, fasteners 60 may provide shear support for fluid accumulators 26 and one or more tensioning elements 48 may be used to secure the fluid accumulators 26 tightly to the tower. In this alternative example, fasteners 60, for example, need not be threaded. Tensioning element 48 may be a circumferential element such as a packing strap or a cable with a turnbuckle.

The fluid accumulators 26 of catchment system 20 (all figures.) may be formed of relative rigid materials, such as fiberglass epoxy composites or thermoplastics. Alternatively, fluid accumulator 26 may be formed of relatively flexible materials, such as rubber or rubber-like materials. In certain embodiments, a combination of rigid and relatively flexible materials may be desirable. Further, collector 30 (as shown in FIGS. 2, 4, 5, 6 and 7) may be formed of rigid or flexible materials. Thus, for example, a flexible cross-linked polyethylene, such as PEX, tube with more rigid thermoplastic fittings may provide a suitable flow path when collector 30 is located within tower 6. Alternatively, a relatively rigid acrylonitrile butadiene styrene (ABS), or polyvinyl chloride (PVC), or steel tubing may be more appropriate when collector 30 is located outside of tower 6. Seals 25 and 27 (as shown in FIGS. 9A, 9B, 10A and 12) may be formed of an oil resistant elastomeric material, although other compressible materials capable of providing a fluid barrier may also be used. For example, seals 25 and 27 may be formed of a silicone sealant. Other suitable materials or combinations of materials for the fluid accumulator, the collector, and any seals would be apparent to persons of ordinary skill in the art, given the benefit of the instant disclosure.

The present invention has been described in terms of preferred and exemplary embodiments thereof. Numerous other embodiments, modifications and variations within the scope and spirit of the appended claims will occur to persons of ordinary skill in the art from a review of this disclosure. Thus, for example, multiple catchment systems may be provided on any one wind turbine. As another example, catchment systems need not extend completely around the circumference of the tower or the wind turbine blade. Further, catchment systems, as described herein, may be provided anywhere along the length of the tower or of the turbine blade. If catchment systems, as described herein, are used to catch oil leaking from a nacelle or other equipment cover, it may be preferable to locate the catchment system close to the nacelle. However, if catchment systems, as described herein, are used to catch water or other cleaning solutions used to wash a wind turbine, it may be preferable to locate such catchment system close to the exterior base of the wind turbine tower. Further, catchment systems, as described herein, particularly when used during washing operations, may be temporarily attached to the tower, for example, by circumferential tensioning elements. Even further, various modifications to the above-described mounting configurations and methods, such as whether the mounting elements are mounted on outer or inner surfaces, or whether the mounting elements are removably or permanently attached, would be apparent to persons of ordinary skill in the art, given the benefit of this disclosure. Optionally, in certain embodiments, one or more fluid accumulators, as described herein, may be integrally formed with the nacelle. The disclosed device may be retrofitted to existing turbine towers or incorporated into new towers during manufacture or construction.

Thus, it is to be understood that other specific arrangements of parts, structures, example devices, systems and environments may be utilized, and structural and functional modifications may be made without departing from the scope of the present invention. All examples, whether preceded by "for example," "such as," "including, or other itemizing terms, or followed by "etc.," are meant to be non-limiting examples, unless otherwise stated or obvious from the context of the specification.

What is claimed:

1. A fluid catchment system for a wind turbine having a nacelle mounted to a tower, the fluid catchment system comprising:
at least one fluid accumulator configured to receive fluid exiting from the interior of the nacelle, the fluid accumulator configured to be positioned adjacent where the nacelle is mounted to the tower and at least partially beneath the nacelle and to be attached to one of the tower or the nacelle; and
a fluid drip guide configured to be located on a lower surface of the nacelle.

2. The fluid catchment system of claim 1, further including:
a collector attached to and in fluid communication with the fluid accumulator, the collector configured to provide a flow path for the accumulated fluid out of the fluid accumulator.

3. The fluid catchment system of claim 1, further including an oil absorbent material located within at least a portion of the fluid accumulator.

4. The fluid catchment system of claim 1, wherein the fluid accumulator is configured to at least partially encircle the tower.

5. The fluid catchment system of claim 1, wherein the fluid accumulator is configured to be attached to an exterior surface of the tower.

6. The fluid catchment system of claim 1, wherein the fluid accumulator is configured to be located within the tower.

7. The fluid catchment system of claim 1, wherein the fluid accumulator is configured to be attached to the nacelle.

8. The fluid catchment system of claim 1, further including at least one seal between the fluid accumulator and the tower.

9. The fluid catchment system of claim 1, further including a tensioning element configured to encircle the tower and retain the fluid accumulator to the tower.

10. The fluid catchment system of claim 1, further including one or more fasteners having a head configured for at least one of: an adhesive attachment; a welded attachment; a threaded attachment; or a through bolted attachment to the tower.

11. A wind turbine system comprising:
a wind turbine having a nacelle;
a tower having a base and a top, the nacelle being mounted to the top of the tower; and
a fluid catchment system including:
one or more fluid accumulators configured to receive fluid exiting from the nacelle, the fluid accumulator(s) positioned adjacent where the nacelle is mounted to the tower and at least partially beneath the nacelle and attached to one of the tower or the nacelle; and
a fluid drip guide located on a lower surface of the nacelle.

12. The wind turbine system of claim 11, wherein the fluid catchment system further includes a collector configured to be attached to and in fluid communication with at least one of the fluid accumulators, the collector configured to provide a flow path for an accumulated fluid out of the fluid accumulator(s).

13. The wind turbine system of claim 11, wherein the fluid drip guide is configured to guide fluid into the catchment system.

14. The wind turbine system of claim 11, wherein the fluid drip guide is configured to inhibit the flow of fluid into the catchment system.

15. The wind turbine system of claim 11, wherein the fluid drip guide extends from the lower surface of the nacelle.

16. The wind turbine system of claim 11, wherein the wind turbine system further includes an oil absorbent material retained by the fluid accumulator(s).

17. A wind turbine system comprising:
a wind turbine having a nacelle;
a tower having a base and a top, the nacelle being mounted to the top of the tower; and
a fluid catchment system including:
one or more fluid accumulators configured to receive fluid exiting from the nacelle, the fluid accumulator(s) configured to be positioned at least partially beneath the nacelle and to be attached to one of the tower or the nacelle,
wherein the fluid catchment system further includes a fluid drip guide located on a lower surface of the nacelle.

18. The wind turbine system of claim 17, wherein the fluid drip guide is configured to guide fluid into the catchment system.

19. The wind turbine system of claim 17, wherein the fluid drip guide is configured to inhibit the flow of fluid into the catchment system.

20. The wind turbine system of claim 17, wherein the fluid drip guide extends from the lower surface of the nacelle.

* * * * *